Dec. 17, 1957   R. N. CROZIER ET AL   2,816,655
LOW ADHESION COATINGS ON ADHESIVE TAPES AND LINERS
Filed Feb. 15, 1954

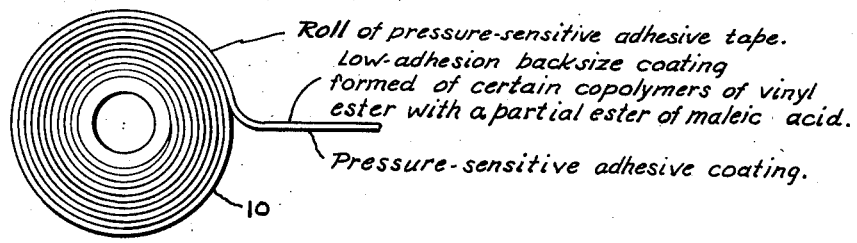

Fig. 1.
- Roll of pressure-sensitive adhesive tape.
- Low-adhesion backsize coating formed of certain copolymers of vinyl ester with a partial ester of maleic acid.
- Pressure-sensitive adhesive coating.

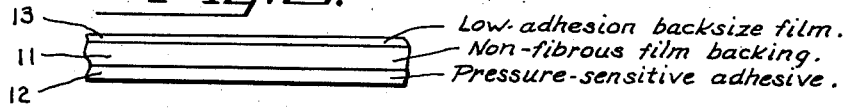

Fig. 2.
- Low-adhesion backsize film.
- Non-fibrous film backing.
- Pressure-sensitive adhesive.

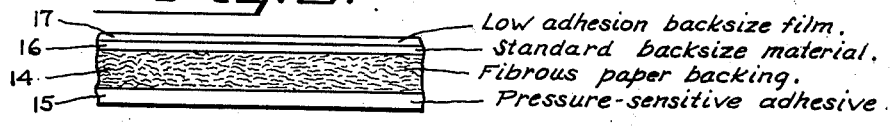

Fig. 3.
- Low adhesion backsize film.
- Standard backsize material.
- Fibrous paper backing.
- Pressure-sensitive adhesive.

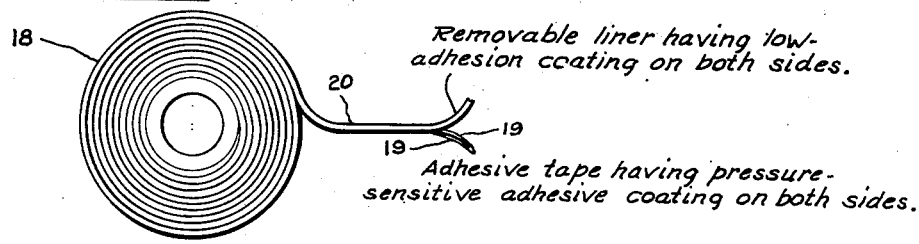

Fig. 4.
- Removable liner having low-adhesion coating on both sides.
- Adhesive tape having pressure-sensitive adhesive coating on both sides.

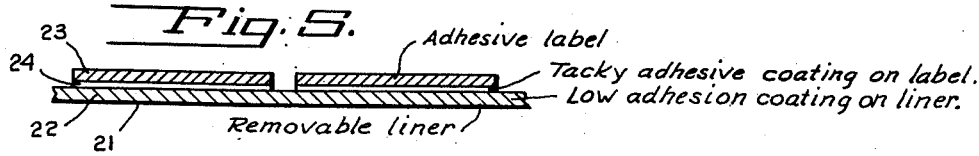

Fig. 5.
- Adhesive label
- Tacky adhesive coating on label.
- Low adhesion coating on liner.
- Removable liner INVENTORS.
ROBERT N. CROZIER
ANGUS N. MacDONALD
AUBREY F. PRICE
BY
Reuben Schmidt
ATTORNEY.

United States Patent Office 2,816,655
Patented Dec. 17, 1957

2,816,655

LOW ADHESION COATINGS ON ADHESIVE TAPES AND LINERS

Robert N. Crozier and Angus Norbert MacDonald, Springfield, and Aubrey F. Price, South Hadley, Mass., assignors to Shawinigan Resins Corporation, Springfield, Mass., a corporation of Massachusetts Application February 15, 1954, Serial No. 410,452

13 Claims. (Cl. 206—59)

This invention relates to new adhesive tapes and liners. More particularly, it relates to adhesive tapes and protective liners with new low adhesion coatings which greatly facilitate the stripping of tapes from rolls or from liners.

Pressure sensitive adhesive tapes are widely used in industry and in the home. They have the advantages of being easy to apply and remove along with the ability to make strong bonds with most materials. Transparent tapes are used to repair torn books, papers, fishing rods, etc. Paper-backed tapes are used to seal packages, for labels and to mask or to bind other masking materials to objects to be painted. Textile-backed adhesive tapes are commonly used in bandages and labelling materials.

The adhesive sides of these tapes must be protected during storage and before application. This is usually done by winding the tape upon itself or by covering the adhesive sides with protective liners formed of sheets of paper or other materials.

It is an object of this invention to provide pressure sensitive adhesive tapes characterized by the ease with which the tapes may be unrolled from their film backing or stripped from protective liners.

It is another object of this invention to provide low adhesion coatings for back-sizing pressure sensitive adhesive tapes. It is a further object of this invention to provide low adhesion coatings for removable liners to be used with pressure sensitive adhesive tapes.

These and other objects are accomplished by coating the non-adhesive side of a tape, or the protective liner with a copolymer of a vinyl ester of a saturated carboxylic acid with a partial ester of maleic acid. The coating may also comprise a mixture of this copolymer with various sizes commonly applied to the film backing.

The use of liners coated with this copolymer facilitates the use of pressure-sensitive adhesives on labels and decalcomania type products. Using the liners thus coated to protect an adhesive layer enables one to use moisture-sensitive adhesives without incurring premature sticking. These liners may also be used to prevent cohesion and adhesion of various tacky materials on storing or in packaging.

A characteristic of the adhesives used in pressure sensitive tapes is the ability to strip cleanly from the surface to which the tape is applied. Considerable force is usually necessary to do this and the force required is a measure of the quality of the bond. For efficient use of tape, however, the force required to unroll it or to remove a protective layer from the adhesive surface must be low. When the force required to unroll or strip the tape approximates the strength of the tape, the tape tears easily and becomes completely unusable in high speed operations. Also, when the stripping or unrolling is done manually, it is an extremely tedious operation if continued for any period. However, the adhesive surface must stick sufficiently well to the backing to permit lapping and sticking of one layer of tape over another. The low adhesion coating must therefore allow a fair amount of adhesion but less than an amount which would require an undue effort to unwind the tape.

By this invention, the stripping force is greatly reduced thereby avoiding tearing and the effort needed with prior tapes, yet sufficient adhesion is allowed so that the tape may be lapped and still form a satisfactory bond. This is accomplished by applying to the surface which contacts the pressure-sensitive adhesive, an extremely thin coating of a vinyl ester-alkyl maleate copolymer.

Embodiments of the invention are illustrated in the accompanying drawing. The various figures show the side or edge of the products in diagrammatic views.

Fig. 1 shows a roll 10 of pressure-sensitive adhesive tape wound directly upon itself. The tape consists of a backing coated on one side with pressure-sensitive adhesive and on the other side with a coating having a low-adherency to the pressure-sensitive adhesive. The tape is wound so that the pressure-sensitive adhesive is on the inside. The low-adhesion coating comprises certain copolymers of vinyl esters with partial esters of maleic acid.

Fig. 2 shows an edge view of magnified section of a pressure sensitive tape consisting of a non-fibrous film backing 11 having the pressure-sensitive adhesive 12 on one broad surface and the low adhesion coating 13 on the other broad surface.

Fig. 3 shows an edge view of a strip of a section of tape in which the film backing 14 consists of fibrous paper and one surface of the paper has a filler sizing 16 underneath the low-adhesion coating 17 while the other surface is coated with the pressure-sensitive adhesive 15.

Fig. 4 illustrates the use of a protective liner 20 having a low adhesion coating on both sides in a rolled pressure-sensitive adhesive tape 18 having pressure-sensitive adhesive on its inner and outer surfaces 19.

Fig. 5 is a cross section view of a series of labels 23 having a pressure-sensitive adhesive surface 24 in contact with a low-adhesion coating 22 on a protective liner 21.

PREPARATION OF THE COPOLYMERS

The copolymers used in this invention can be made in conventional polymerization equipment. For example, the following composition was prepared in a 50-gallon glass-lined jacketed polymerization kettle fitted with an agitator and a reflux condenser. Where parts are mentioned, they are parts by weight.

26 parts of maleic anhydride were added to the kettle. The jacket temperature was raised to 75° C. to melt the maleic anhydride. Thereafter, 74 parts of octadecyl alcohol were slowly added over a period of 1½ hours during which time the batch temperature was raised to 100° C. The reaction produced an ester of substantially equal molar parts of the alcohol and the maleic anhydride, a 3% excess of the alcohol having been used to drive the reaction to completion.

The charge was then cooled to the reflux temperature of benzene and 200 parts of benzene were added followed by 2 parts of benzoyl peroxide.

35 parts of vinyl acetate were then added in a very slow stream so that the addition time was about 7 hours. Reflux temperature was maintained all during the addition. When all the vinyl acetate had been added, heating was continued for another hour to insure complete reaction. The product was a benzene solution of a vinyl acetate-mono-octadecyl maleate copolymer in the ratio of 1.5 mols of vinyl acetate per mol of partial maleic ester. It may be applied from this solution or precipitated out of solution and dried.

COPOLYMERS USEFUL IN THIS INVENTION

These copolymers are unique in that a simple copolymerization reaction unites in one macromolecule, short-chain ester groups, carboxyl groups and long-chain ester groups. Many variations are possible yet surprisingly only a relatively small range of compositions are effective low adhesion coatings. These are delineated below.

(a) Ratio of vinyl ester to maleic ester

The preferred composition range is from 1 to 5 mols of vinyl ester to 1 mol of the alkyl maleate. With higher ratios of vinyl ester to alkyl maleate, the adhesive resisting activity is too slight to be useful in present day tapes which must stand temperature extremes in storage. Lower ratios of vinyl ester to alkyl maleate yield copolymers with inferior film-forming ability.

(b) Ratio of alkyl groups to maleic acid

In our invention, we have found that the existence of unreacted carboxyl groups in the copolymer is highly advantageous. Full diesters are therefore not desired. On the other hand, copolymers of vinyl esters with maleic anhydride or maleic acid do not form satisfactory low adhesion coatings. Our preferred partial esters are made by reacting an alcohol with maleic anhydride in the range from ½ to 1½ mols of an alkyl alcohol per mol of maleic acid.

(c) Alkyl esters of maleic acid

Decyl (C–10) maleates to docosyl (C–22) maleates and mixtures of these maleates cover the range of usable co-monomers. Lauryl, palmityl and stearyl are among the well-known alkyl groups included in these esters. We prefer the C–16 to C–20 range because of their excellent efficiency in the coatings. These alcohols and mixtures of these alcohols are readily available and economical.

(d) Vinyl esters

Copolymers forming the more desirable low-adhesion coatings are composed of these alkyl maleates with vinyl esters of saturated carboxylic acids containing 2–6 carbon atoms such as acetic, propionic, butyric, valeric and caproic acids. The low adhesion coating must be firmly bonded to the fibrous or non-fibrous backing. If the low adhesion coating pulls off with the adhesive, the efficiency of the adhesive is seriously impaired. Copolymers made with these vinyl esters adhere to the backing and yet are sufficiently non-adhesive to allow easy stripping of the adhesive layer.

THE ADHESIVES

Extensive tests have proven the effectiveness of these copolymers in a large variety of adhesive tapes. The adhesives useful in such tapes are designed to strip off cleanly. Some are based on synthetic rubber or natural rubber to which have been added various softeners or tackifiers; others are compositions of polyvinyl ethers or other resins.

The vinyl ester-alkyl maleate copolymers used in this invention are hydrophobic. This property makes the copolymers useful with adhesives based on water-soluble or water-sensitive resins. Examples of this type are adhesives containing partially hydrolyzed polyvinyl acetate and its copolymers.

THE FILM BACKING

The vinyl ester-alkyl maleate copolymer may be used on all types of common film backings.

On plain or crepe papers, various sizing materials such as natural and synthetic resins, are commonly used to enhance the strength and reduce the porosity of the paper. It is usually more economical to mix the copolymer with these backsizes and apply both together but the copolymer may be applied alone to paper previously sized. Copolymer applied even to unsized paper has the effect of strengthening the paper.

The use of these vinyl ester-alkyl maleate copolymers on textile film backings closely parallels that on paper. Woven textiles are usually sufficiently strong to resist tearing and ripping when the tape is removed from a roll or from the place it has been applied. The added strength gained by sizing the fabric with the copolymer is not usually needed so it is preferable to presize the textile backing in order to reduce the amount of copolymer required. The presize may be any of the common textile sizes including starch, casein, polyvinyl acetate or other resins. Here also, the copolymer may be applied alone or in a mixture with the size.

Many other types of film backings are commonly used. Examples are cellophane, ethyl cellulose, cellulose nitrate, cellulose aceto-butyrate, polyvinyl acetate, hydrolyzed polyvinyl acetate, polyvinyl formal, polyvinyl butyral, polyvinyl acetal, polyvinyl chloride, etc. All can be effectively treated with the vinyl ester-alkyl maleate copolymer alone or in a mixture with conventional coatings for these film backings. The copolymer is particularly useful with smooth hard-surfaced film backings since it will adhere firmly to the backing while its outer surface is inactive to pressure-sensitive adhesives.

Many film-forming materials are sensitive to moisture. The use of the copolymer coating of this invention not only provides a low adhesion surface but also imparts moisture resistance because of the hydrophobic character of the copolymer.

The discussion of these film backings applies to liners as well as tapes.

APPLYING THE COPOLYMER

The copolymer or mixtures of the copolymer with backsizing materials may be applied from solution in organic solvents or from aqueous dispersions. Benzene, toluene and ethyl acetate are typical solvents for the copolymer. The most economical method is to coat the film backing in a continuous manner by means of wet rolls and then drying by passing over steam-heated drums. Only one roll is in contact with a solution or dispersion of the copolymer for tapes requiring one low-adhesion surface. Protective liners for tapes having two adhesive surfaces must be treated on both sides. This may be done by dipping followed by squeeze rolls or by having two wet rolls.

Only an extremely thin coating of the copolymer is required to substantially reduce the stripping force. With the exception of very porous film backings, less than two-tenths of an ounce of copolymer per square yard of backing is usually sufficient.

Pressure-sensitive adhesive tapes having a film backing of a smooth material such as cellophane usually require less copolymer than paper or textile-backed tapes. Tapes made of cellophane sheeting backsized with only 0.005 ounce per square yard of a copolymer of vinyl acetate with a partial dodecyl maleate are substantially easier to unwind than cellophane tapes with a standard backsize or none at all. This copolymer is in a molar ratio of vinyl ester to maleate of 2 to 1 and the maleic ester is composed of ¾ mol of normal dodecyl alcohol and 1 mol of maleic acid. The improvement exists in stored tapes as well as freshly prepared tapes. A primer is often used to bind low-adhesion coatings to cellophane. These copolymers, however, need no additional binder and may be applied directly.

These thin copolymer coatings have outstanding low adhesion characteristics even when diluted by being applied in a mixture with a standard backsize. Four rolls of masking tape were preparing using a backing of crepe paper. The paper for two tapes was roll-coated on one side with a mixed solution containing our copolymer and an alkyd resin and then dried. The copolymer was the vinyl acetate with mono-octadecyl maleate in benzene made as described above and the alkyd was a lauric acid-modified glycol phthalate resin in a toluene-alcohol solvent system. The mixed solution contained 1 part copolymer to 50 parts of alkyd resin by weight and the contration of copolymer deposited on the paper amounted to 0.02 ounce per square yard of paper. For the purposes of the tests illustrated below, the tapes prepared with this mixed backsize are referred to as copolymer coated. Two other tapes were prepared with a backsize consisting of the alkyd resin alone. These are referred to below as uncoated. The untreated sides of the four tapes were coated with a rubber-resin pressure-sensitive adhesive and the dried tapes were wound upon themselves into rolls. The tapes backsized with the alkyd resin alone were considerably mode difficult to unwind than the tapes backsized with the mixtures.

TESTING THE LOW-ADHESION COATING

Some results of tests on tape are shown below to illustrate the efficiency of these copolymer coatings. In testing low-adhesion coatings on tapes, the force required to strip tape from a roll or a removable liner is the important property. The force required is partially dependent upon stripping speed and is usually reported in pounds of "pull-up tension" at specified speeds. The pick-off of easily observable amounts of pressure-sensitive adhesive or low-adhesion coating from the film backing is regarded as complete failure and no force is recorded.

The initial efficiency of many low-adhesion coatings on adhesive tapes decreases greatly within a few days after being rolled. High or low temperatures, moisture and contact with the pressure-sensitive adhesive are among the causes. The masking tapes prepared above were, therefore, aged 7 days before the effort required to unwind them was measured. One of the copolymer coated tapes and an uncoated tape were stored at normal room temperature and humidity. The other pair was stored under controlled conditions at 100° F. and a relative humidity of 80%. The following results were obtained:

TEST "A"—TAPE AGED 7 DAYS AT ROOM TEMPERATURE

| Stripping speed | Pull-up tension in pounds | |
|---|---|---|
| | Copolymer coated | Uncoated |
| 40 feet per minute | 3.3 | 3.6 |
| 115 feet per minute | 3.6 | 4.5 |
| 315 feet per minute | 4.0 | 6.0 |

TEST "B"—TAPE AGED 7 DAYS AT 100° F. AND 80% R. H.

| 40 feet per minute | 3.2 | 5.6 |
|---|---|---|
| 115 feet per minute | 4.9 | 6.4 |
| 315 feet per minute | 6.0 | 8.5 |

The foregoing description is given in illustration and not in limitation of the invention as set forth in the appended claims.

What is claimed is:

1. An adhesive tape comprising a film backing, a pressure-sensitive adhesive on one side of the backing and on the other side a low-adhesion coating comprising a copolymer of from 1 to 5 mols of a vinyl ester of a saturated carboxylic acid containing from 2 to 6 carbon atoms with 1 mol of a partial alkyl ester of maleic acid, the maleic ester being composed of ½ to 1½ mols of an alkyl alcohol containing from 10 to 22 carbon atoms and 1 mol of maleic acid.

2. An adhesive tape according to claim 1 wherein said alkyl alcohol contains from 16 to 20 carbon atoms.

3. An adhesive tape according to claim 1 wherein said vinyl ester is vinyl acetate and said maleic ester is mono-octadecyl maleate.

4. An adhesive tape wound upon itself in roll form, having a cellulosic film backing coated on the inner face with a pressure-sensitive adhesive and coated on the outer face with a low-adhesion composition comprising a copolymer of from 1 to 5 mols of a vinyl ester of a saturated carboxylic acid containing from 2 to 6 carbon atoms with 1 mol of a partial alkyl ester of maleic acid, the maleic ester being composed of from ½ to 1½ mols of an alkyl alcohol containing from 10 to 22 carbon atoms and 1 mol of maleic acid.

5. A rolled adhesive tape comprising a porous paper sheet impregnated with a sizing material, coated on the inner face with a pressure-sensitive adhesive and coated on the outer face with a low-adhesion coating composition comprising a copolymer of from 1 to 5 mols of a vinyl ester of a saturated carboxylic acid containing from 2 to 6 carbon atoms with 1 mol of a partial alkyl ester of maleic acid, the maleic ester being composed of from ½ to 1½ mols of an alkyl alcohol containing from 10 to 22 carbon atoms and 1 mol of maleic acid, said outer coating being inactive to the pressure-sensitive adhesive to an extent permitting easy unwinding of the adhesive tape without delamination of the low-adhesion coating, offsetting of the adhesive and tearing of the film backing.

6. In a method of making an adhesive tape comprising a film backing and a pressure-sensitive adhesive on one side of the backing, the step comprising applying to the other side of the backing a coating of a copolymer of from 1 to 5 mols of a vinyl ester of a saturated carboxylic acid containing from 2 to 6 carbon atoms with 1 mol of a partial alkyl ester of maleic acid, the maleic ester being composed of ½ to 1½ mols of an alkyl alcohol containing from 10 to 22 carbon atoms and 1 mol of maleic acid.

7. A method according to claim 6 wherein said alkyl alcohol contains from 16 to 20 carbon atoms.

8. A method according to claim 6 wherein said vinyl ester is vinyl acetate and said maleic ester is mono-octadecyl maleate.

9. A film backing having on at least one of its broad surfaces a low-adhesion coating for the protection of pressure-sensitive adhesive surfaces, said coating comprising a copolymer of 1 to 5 mols of a vinyl ester of a saturated carboxylic acid containing from 2 to 6 carbon atoms with 1 mol of a partial alkyl ester of maleic acid, the maleic ester being composed of ½ to 1½ mols of an alkyl alcohol containing 10 to 22 carbon atoms and 1 mol of maleic acid.

10. In combination with a film backing carrying a pressure-sensitive adhesive coating on at least one side thereof, a removable liner having a low adhesion coating in contact with the pressure-sensitive adhesive, said low-adhesion liner coating comprising a copolymer of from 1 to 5 mols of a vinyl ester of a saturated carboxylic acid containing from 2 to 6 carbon atoms with 1 mol of a partial alkyl ester of maleic acid, the maleic ester being composed of from ½ to 1½ mols of an alkyl alcohol containing from 10 to 22 carbon atoms and 1 mol of maleic acid.

11. A combination according to claim 10 wherein said alkyl alcohol contains from 16 to 20 carbon atoms.

12. A combination according to claim 10 wherein said vinyl ester is vinyl acetate and said maleic ester is mono-octadecyl maleate.

13. In combination with a rolled adhesive tape comprising a film backing and a pressure-sensitive adhesive coating on the surface of the inner and outer faces, a removable liner having a low-adhesive coating on the surface of both faces, the liner being interposed between the layers of adhesive tape, the low-adhesion coating thereby being in contact with the pressure-sensitive adhesive coating, said low-adhesion coating comprising a copolymer of from 1 to 5 mols of a vinyl ester of a saturated carboxylic acid containing from 2 to 6 carbon atoms with 1 mol of a partial alkyl ester of maleic acid, the maleic ester being composed of from ½ to 1½ mols of an alkyl alcohol containing from 10 to 22 carbon atoms and 1 mol of maleic acid.

References Cited in the file of this patent

UNITED STATES PATENTS 2,168,535   Nuesslein et al. _____ Aug. 8, 1939